(12) United States Patent
Tang et al.

(10) Patent No.: US 7,870,363 B2
(45) Date of Patent: Jan. 11, 2011

(54) METHODS AND ARRANGEMENTS TO REMAP NON-VOLATILE STORAGE

(75) Inventors: Jian Tang, Shanghai (CN); Yufu Li, Shanghai (CN); Ping Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 466 days.

(21) Appl. No.: 12/006,017

(22) Filed: Dec. 28, 2007

(65) Prior Publication Data

US 2009/0172340 A1 Jul. 2, 2009

(51) Int. Cl.
G06F 12/06 (2006.01)
(52) U.S. Cl. ........................ 711/203; 711/103; 711/202; 711/209; 711/E12.078
(58) Field of Classification Search .................. 711/103, 711/202–203, 209, E12.078
See application file for complete search history.

(56) References Cited

U.S. PATENT DOCUMENTS

| 7,590,815 | B1* | 9/2009 | de Waal | ........................ | 711/170 |
| 2003/0133475 | A1* | 7/2003 | Solheim et al. | ............. | 370/532 |
| 2008/0155317 | A1* | 6/2008 | Kim et al. | ........................ | 714/8 |

\* cited by examiner

Primary Examiner—Jasmine Song
(74) Attorney, Agent, or Firm—Schubert Law Group, PLLC; Neil K. Cohen

(57) ABSTRACT

Methods and arrangements for remapping the map between logical space and physical space in non-volatile storage are described. Embodiments include transformations, code, state machines or other logic to divide the non-volatile storage of the computing device into two portions, a fixed portion and a floating portion. The embodiments may also include remapping in system firmware of the computing device the current map from logical space to physical space of the floating portion of the non-volatile storage. The embodiments may also include storing the revised map. The embodiments may also include using the revised map to access the floating portion of the non-volatile storage.

20 Claims, 4 Drawing Sheets

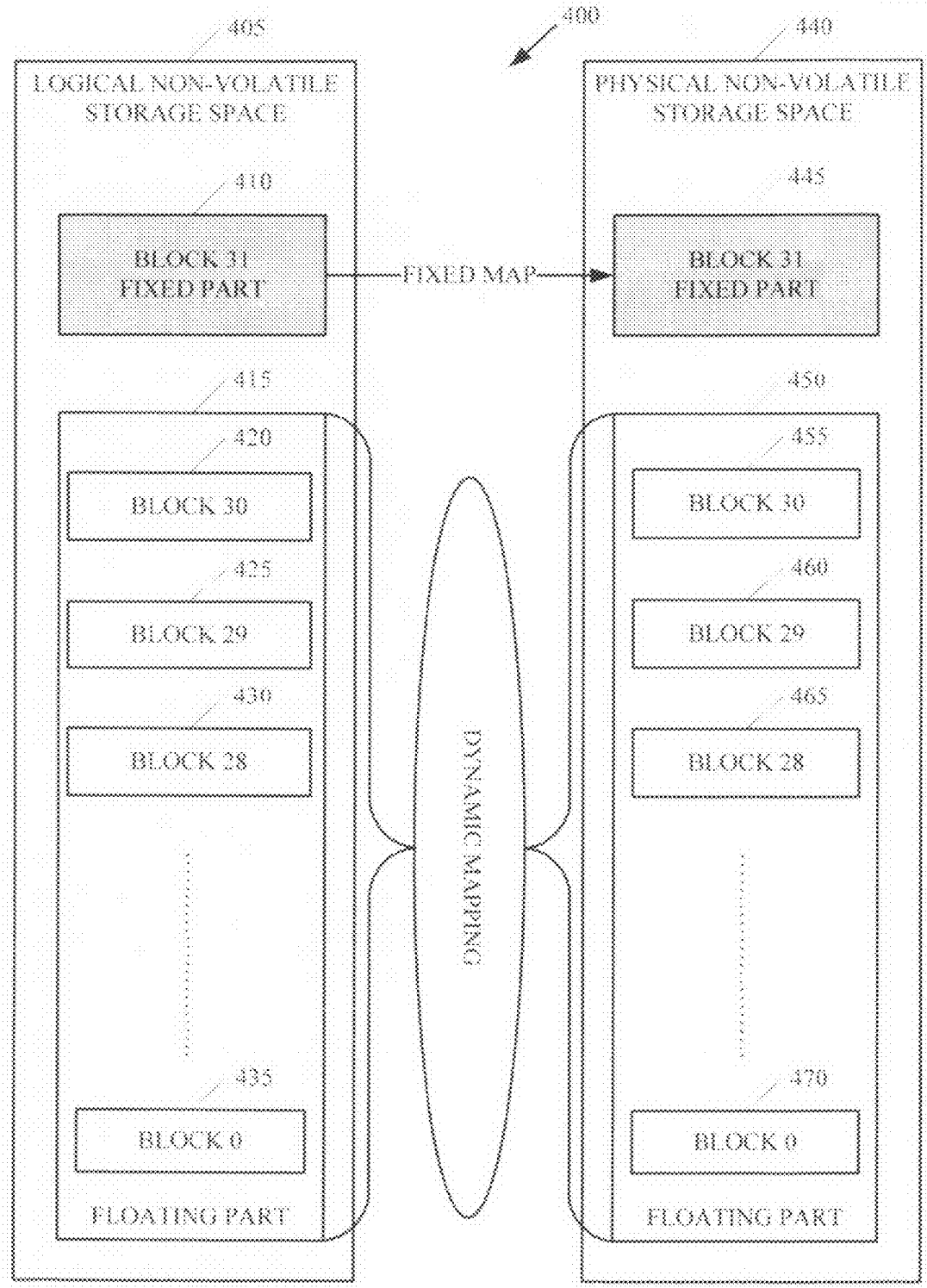

METHODS AND ARRANGEMENTS TO REMAP NON-VOLATILE STORAGE

FIELD

The present invention is in the field of electronic storage. More particularly, embodiments are in the field of remapping the map between logical space and physical space in non-volatile storage.

BACKGROUND

The life of a block of non-volatile storage, such as a block of flash storage, may depend on the number of times the block is erased or rewritten. For example, NOR-based flash may last for 10,000 to 1,000,000 erase cycles. NAND flash may have ten times the endurance. The repeated erasures may wear out a chemical component of flash and other types of non-volatile storage. Layers of the chemicals may lie between pairs of transistors. Writing to a location may require setting a charge in the chemicals between a transistor pair, and erasing the value in a location may require application of an electric charge to the chemicals. Repeated application of the charges may destroy their potency. In many types of non-volatile storage, such as flash memory and EEPROM, writing and erasing is done a block at a time. Thus, a series of erasures and writes to separate locations of a block may cause multiple erasures and writes to the block as a whole. Further, the failure of a single block may cause the failure of the entire system of non-volatile storage. Thus, the life of an entire chip of non-volatile storage may depend on the life of its most used block.

In some current systems, some blocks of non-volatile storage are used intensively. For example, typically firmware components and non-volatile system storage area are fixed in flash device. System firmware typically uses a fixed range of flash space to serve as non-volatile storage. New introduced technologies such as IPMI (Intelligent Platform Management Interface) and WHEA (Windows Hardware Error Architecture) need non-volatile storage to save event or error logs to provide full functionality. Advanced system software such as server management and error logging may impose much more frequent erase and programming operations on non-volatile storage area. This more frequent use may introduce potential risks of device damage to the non-volatile storage and system instability. Because the frequently used space may be a narrow portion of the chip, these portions may be near failure while other portions are rarely used.

BRIEF DESCRIPTION OF THE DRAWINGS

Aspects of the invention will become apparent upon reading the following detailed description and upon reference to the accompanying drawings in which like references may indicate similar elements:

FIG. 4 is a diagram of an embodiment of an architecture of non-volatile storage for remapping the non-volatile storage.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Generally speaking, methods and arrangements for remapping the map between logical space and physical space in non-volatile storage are contemplated. Embodiments include transformations, code, state machines or other logic to divide the non-volatile storage of the computing device into two portions, a fixed portion and a floating portion. The embodiments may also include remapping in system firmware of the computing device the current map from logical space to physical space of the floating portion of the non-volatile storage. The embodiments may also include storing the revised map. The embodiments may also include using the revised map to access the floating portion of the non-volatile storage.

Figure 1:
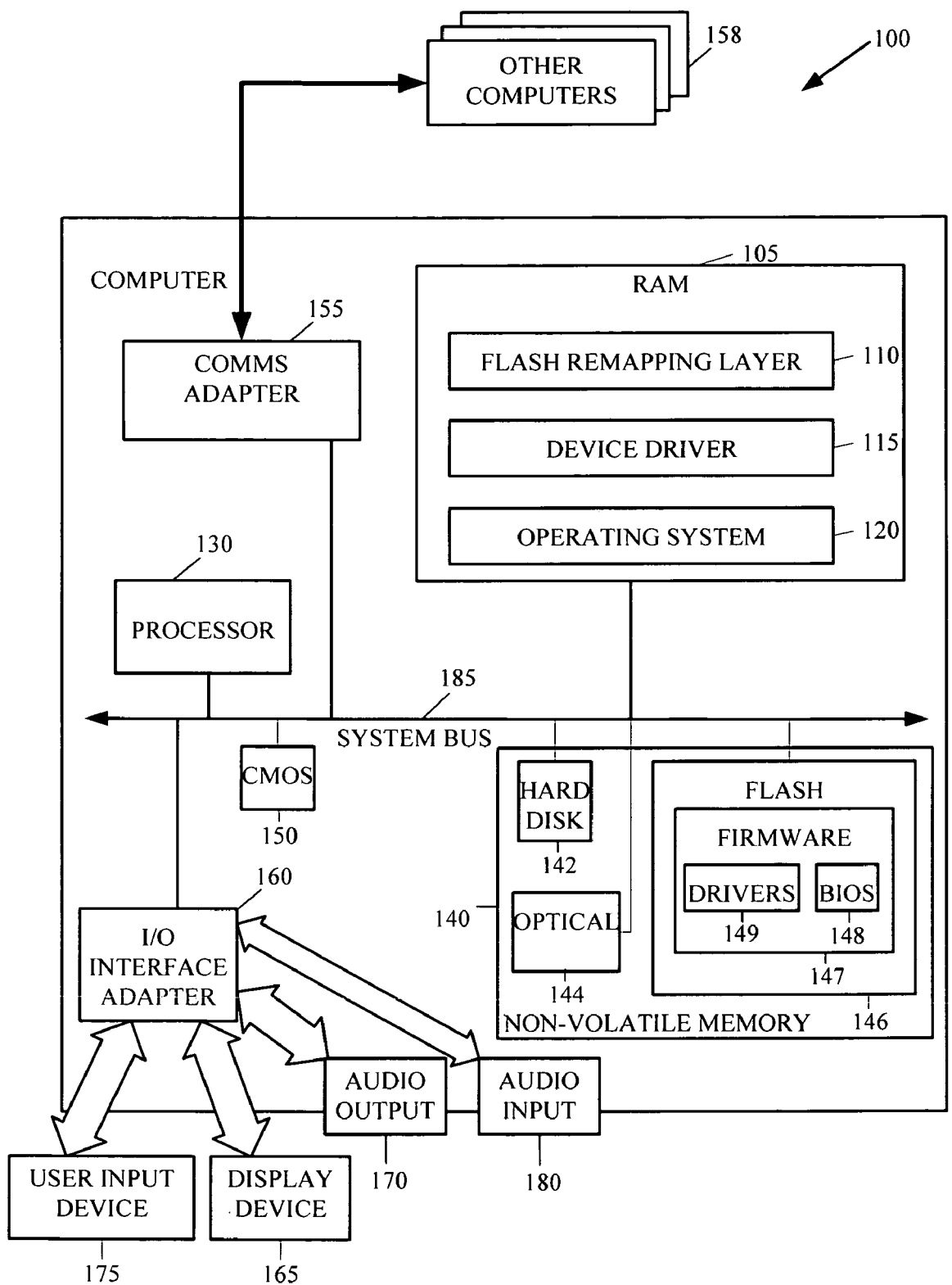
FIG. 1 is a diagram of an embodiment of a computer to remap non-volatile storage.

Turning to FIG. 1, depicted is an embodiment of a computer 100 capable of remapping non-volatile memory that includes random access memory (RAM) 105, a processor 130 or CPU, non-volatile memory 140, CMOS 150, a communications adapter 155, and an Input/Output (I/O) interface adapter 160 connected by system bus 185. Stored in RAM 105 is flash remapping layer 110, device driver 115, and operating system 120.

Flash remapping layer 110 may comprise computer program instructions for remapping the map between logical space and physical space for flash storage 146. Logical space may constitute the view of storage from programs that access the storage. The view includes the addresses available. Physical space is the addresses of storage as seen by the hardware itself. In some embodiments, a map between logical space and physical space may associate blocks in one space with blocks in the other. Flash remapping layer 110 may change, or remap, the association between the blocks. Flash remapping layer 110 may save the revised map in RAM 105, in non-volatile memory 140, in CMOS 152, or in some combination of these memories. Flash remapping layer 110 may access flash memory 146 by using the revised map.

Device driver 115 may comprise computer program instructions to mediate between operating system 120 and flash memory 146. Device driver 115 may convert from the instructions of operating system 120 to signals that may control flash memory 146. The instructions of device driver 115 may also convert signals produced by flash memory 146 to data that can be processed by operating system 120. Operating system 120 may comprise UNIX™, Linux™, Microsoft Windows™, AIX™, IBM's i5/OS™, or other operating systems useful for remapping the map between logical space and physical space in non-volatile storage as will occur to those of skill in the art. Flash remapping layer 110, device driver 115, and operating system 120 (components of software) are shown in RAM 105 in FIG. 1, but many components of such software may be stored in non-volatile memory 140 also. Further, while the components of such are shown simultaneously present in RAM, in some other embodiments, only some of the components of RAM 105 may be present at any given time.

Non-volatile computer memory 140 constitutes memory that may retain its contents when the power of computer 100 is turned off. Non-volatile memory may be implemented as a hard disk drive 142, optical disk drive 144, electrically erasable programmable read-only memory space (EEPROM or Flash memory) 146, RAM drives (not shown), or as any other kind of computer memory as will occur to those of skill in the art. Flash memory 146 includes firmware 147. Firmware is programming that is inserted into flash memory, other programmable read-only memory, or other memory functionally independent of main storage and which becomes a stable part of a computing device, or part of a combination of hardware and software. Examples of firmware in some computers include code that enables the power subsystem hardware, code that enables Ethernet PCI adapters or disk drives, and code that enables the BIOS or Basic Input/Output System on operating systems running over DOS. Other functions carried out by firmware may include storage management, pointers and addressing, program management functions, exception and event management, data functions, I/O managers, and security. Firmware 147 includes BIOS 148 and drivers 149. BIOS is the part of the operating system that provides the lowest level interface to peripheral devices. It is code that may control a computer at start-up and may manage data flow between operating system 120 and peripheral devices such as hard disk 142, user input device 175, and printers. Drivers 149 include code to mediate between operating system 120 and various hardware devices of computer 100. Drivers 149 may include the code that controls flash 146. CMOS (complementary metal-oxide semiconductor) 150 is a chip powered by a small battery that may retain critical information about the hardware of computer 100 even when power is turned off. In some embodiments, CMOS 150 may hold the map between the logical and physical space of flash 146.

Communications adapter 155 may implement the hardware level of data communications between computer 100 and other computers, such as other computers 158. The data communications may occur directly or through a network. Such data communications may be carried out through serially through RS-132 connections, through external buses such as USB, through data communications networks such as IP networks, and in other ways as will occur to those of skill in the art. Examples of communications adapters include modems for wired dial-up communications, Ethernet (IEEE 802.3) adapters for wired network communications, and 802.11a/b/g/n adapters for wireless network communications.

I/O interface adapter 160 implements user-oriented I/O through, for example, software drivers and computer hardware for controlling output to display devices such as display device 165 and audio output device 170 as well as user input from user input device 175 and audio input device 180. User input device 175 may include both a keyboard and a mouse. Some embodiments may include other user input devices such as speech interpreters, bar code scanners, text scanners, tablets, touch screens, and/or other forms of user input devices. Audio output 170 may include speakers or headphones and audio input device 180 may include a microphone or other device to capture sound.

The computer and components illustrated in FIG. 1 are for explanation, not for limitation. In some embodiments, embedded systems, PDAs, cell phones, BlackBerries® and other computing devices may remap the map between logical space and physical space in non-volatile storage. In many embodiments, modules to remap the map between logical space and physical space in non-volatile storage may be implemented in hardware, firmware, or in state machines or may form a component of an operating system. In several embodiments, a computing device may contain two or more processors. In various embodiments, a computing system may use point-to-point interconnects rather than buses to connect processors or to connect a processor and another element of the computing system.

In FIG. 1, the remapping layer applies to flash memory. In other embodiments, a remapping layer may remap other kinds of non-volatile storage. In further embodiments, a remapping layer or layers may remap several different kinds of non-volatile storage. In the embodiment of FIG. 1, a revised map between the logical and physical space of non-volatile storage may be stored in CMOS 150. In other embodiments, a revised map may be stored in alternative or additional non-volatile storage. In many embodiments, components shown in FIG. 1 may be omitted, components not shown in FIG. 1 may be added, or both.

Figure 2:
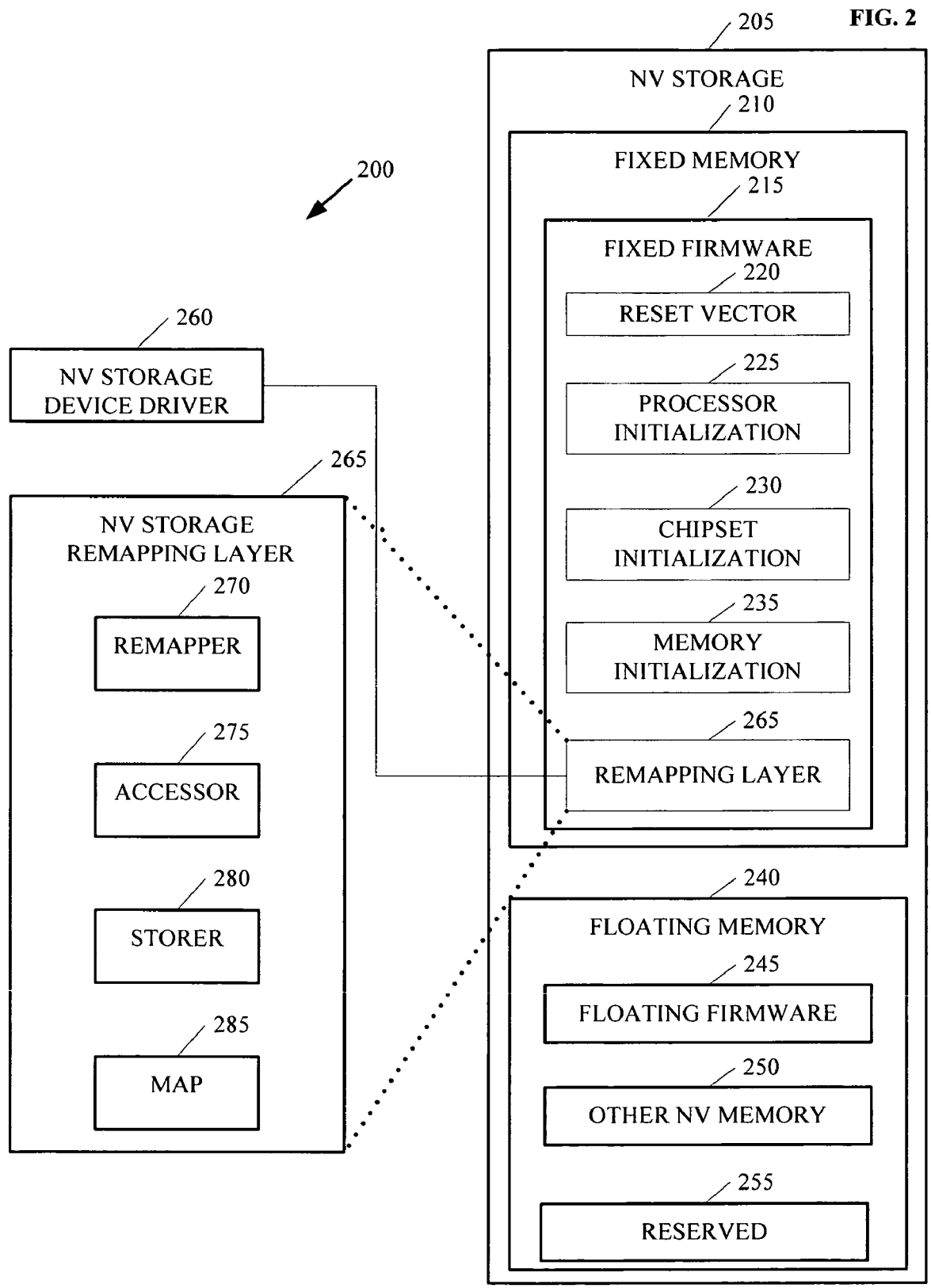
FIG. 2 is a diagram of an embodiment of an apparatus to remap non-volatile storage.

Turning to FIG. 2, shown is a diagram 200 of an embodiment of an apparatus to remap the map between logical space and physical space in non-volatile storage. Diagram 200 includes non-volatile storage 205 and non-volatile storage device driver 260. Non-volatile storage 205 is divided into two portions, fixed memory 210 and floating memory 240. The map between logical space and physical space of non-volatile storage 205 is fixed for fixed memory 210, but varies for floating memory 240. For example, a remapping may change the association between a block in the floating portion of logical space and a block in the floating portion of physical space, but the association between a block in the fixed portion of logical space and a block in the fixed portion of physical space is invariant.

Fixed memory 210 includes a portion of firmware, designated as fixed firmware 215, which in turn includes reset vector 220, processor initialization components 225, chipset initialization components 230, memory initialization components 235, and remapping layer 265. These components of fixed firmware 215 may constitute components critical for startup and rebooting. Reset vector 220 contains code that is run at startup and rebooting. From a processor's point of view, the processor typically begins execution at a fixed address (typically immediately below 4G) after system powers on or resets. The code located at the fixed address is called the reset vector. Both XPF and IPF based platforms have such convention. From an architecture point of view, the block which contains the reset vector may be mapped into a fixed location of hardware flash device, because the remapping layer is not available to translate between a physical and logical address. The fixed memory 210 block also contains other critical components for start-up and reboot, such as processor initialization 225, chipset initialization 230, and memory initialization components 235. The flash remapping layer 265 is also in fixed firmware 215, because only after this flash remapping layer 265 is available can the processor manage components in the floating part of memory 240.

Remapping layer 265 remaps the current map from logical space to physical space of non-volatile storage 205 to produce a revised map, stores the revised map, and uses the revised map to access non-volatile storage 205. An expanded view of remapping layer 265 is shown on the left of FIG. 2. Remapping layer 265 includes remapper 270, accessor 275, storer 280, and map 285.

Remapper 270 remaps the current map from logical space to physical space of the floating portion of the non-volatile storage, thereby creating a revised map. In many embodiments, both spaces may be divided into blocks of a fixed length, and the current and revised maps may map blocks from one space to blocks of another space. Turning to FIG. 4, shown is a diagram 400 of an architecture for non-volatile storage which depicts logical and physical space divided into blocks. Diagram 400 may be used to illustrate a variety of mappings from logical to physical space in accordance with embodiments of the invention. The mappings may include remappings, or modifications of current mappings. Diagram 400 includes logical space 405 and physical space 440. The spaces are representations of the same non-volatile storage. Each space is divided into a fixed part (410 for logical space 405 and 445 for physical space 440), and a floating part (415 for logical space 405 and 450 for physical space 440). These are in turn divided into blocks. The fixed parts 410 and 445 each contain a single block, labeled as block 31. The floating parts 415 and 445 are each divided into 31 blocks. Blocks 0, and 28 through 30 are shown (elements 435, 430, 425, and 420 for logical space; elements 470, 465, 460, and 455 for physical space).

Remappings produced under the framework of FIG. 4 always map block 31, the fixed part 410 of logical space, to block 31, the fixed part 445 of physical space. The remappings from the blocks in the floating part 415 of logical space to the floating part of physical space may vary. From a high level user pointer of view, the locations of data in the non-volatile storage may seem fixed, because they may be referenced by the same logical address. Nevertheless, because the logical to physical space map changes, the physical addresses of the data may change. In some instances, a revised map may simply rotate the physical block mapped to a logical block with the next-higher physical block, and block 30 with 0. For example, a current map may simply map a logical block to the physical block with the same number. This map may be illustrated as:

| Mapping 1 | |
| --- | --- |
| Logical space | Physical space |
| 0 | 0 |
| 28 | 28 |
| 29 | 29 |
| 30 | 30 |

Rotating each block of physical space with the next-higher block (and block 30 with block 0) produces the following remapping:

| Mapping 2 | |
| --- | --- |
| Logical space | Physical space |
| 0 | 1 |
| 28 | 29 |
| 29 | 30 |
| 30 | 0 |

Continuing to remap the map from logical space to physical space by rotating upwards one block produces a series of remappings for which each block of logical space is mapped in turn to each block of physical space in the course of the remappings. For example, logical block 28 would be mapped in turn to block 28, block 29, block 30, and blocks 1 through 27. A similar series may exchange each block of physical space with the next-lower block.

More complicated remappings may be based upon usage. A remapping layer, such as remapping layer 265 of FIG. 2, may record statistics for writing and erasures by blocks for logical space 405 and physical space 440. Then, for example, in an attempt to balance the usage of the blocks, the remapping layer may producing a mapping from logical storage to physical storage by mapping the most active logical block to the least active physical block, and so on. For example, suppose the following table sets forth the usage of the four blocks of the floating part of non-volatile storage for some duration:

| Usage Table | | |
| --- | --- | --- |
| Block | Logical space usage | Physical space usage |
| 0 | 0 | 0 |
| 1 | 4 | 10 |
| 2 | 30 | 15 |
| 3 | 8 | 17 |

Under the conditions of the above Usage Table, the following remapping might be generated:

| Mapping 3 | |
| --- | --- |
| Logical space | Physical space |
| 0 | 3 |
| 1 | 2 |
| 2 | 0 |
| 3 | 1 |

In this remapping, the least-used address space of logical storage, block 0, is mapped to the most-used block of physical space, block 3. Similarly, the most-used address space of logical storage, block 2, is mapped to the least-used block of physical space, block 0. As a result, if usage of logical space continues in the same pattern, the remapping may balance the usage of blocks of physical space.

As indicated by FIG. 4, the mapping between floating part 415 of logical space and floating part 450 of physical space is dynamic; that is, the mapping may be remapped or changed systematically. In some embodiments, the remappings may be generated periodically. For instance, a remapping layer may remap the map between the floating part of logical storage 415 and the floating part of physical storage 450 weekly or monthly. In other embodiments, the remappings may be generated based upon usage. For example, a remapping layer may remap the map between the floating part of logical storage 415 and the floating part of physical storage 450 based upon the number of writes or erasures or both performed on the floating part of physical storage 450 or upon a particular block, such as the most active block, of the floating part of physical storage 450.

The diagram 400 of non-volatile storage architecture is for illustration and not limitation. In a few embodiments, the mapping between logical space and physical space may not be based on blocks. In many embodiments, the fixed part may consist of more than one block. In several embodiments, the non-volatile storage may consist of more or less than 32 blocks. In numerous embodiments, the fixed portion may not include block 31. In addition, the remappings and the conditions for generation as described above are for illustration and not limitation. In other embodiments, remappings may be created under conditions as will occur to those of skill in the art.

Regular remappings of non-volatile storage such as those illustrated in connection with the discussion of FIG. 4 may increase the useful life of the non-volatile storage in some embodiments. The life of a block of non-volatile storage, such as a block of flash storage, may depend on the number of times the block is erased or rewritten. In some current systems, some blocks of non-volatile storage are used intensively. Because the frequently used space may be a narrow portion of the chip, these portions may be near failure while other portions are rarely used. In some embodiments, regular remappings may to a great extent balance out the load on each block, thereby reducing the erasings and rewritings of the most used blocks. For example, these remappings may rotate the blocks of physical memory which receive the most intensive usage. In some embodiments, the regular remappings may significantly extend the lifetime of flash devices and other non-volatile storage and enhance the reliability, availability and serviceability of the non-volatile storage.

For example, a 2 MB flash device may be divided into 32 blocks of 64 KB each, similar to the blocks 0 through 31 of the non-volatile storage of FIG. 4. In previous art, the flash storage used for system management may be fixed in one 64 KB block. This block may be erased and rewritten very frequently, so that the maximum lifetime of the whole flash is decided by the single block's lifetime, here denoted T. In an embodiment, 30 blocks may be placed into the floating part of non-volatile storage, thus enabling a specific block of logical space to be dynamically remapped to any one of the 30 blocks of physical space. In some circumstances, this dynamic remapping may extend the whole flash device's lifetime to as long as 30T, assuming that the usage on the other blocks is small compared to the usage of this block and the remappings distribute the load evenly.

Returning to FIG. 2, accessor 275 may access non-volatile storage 205 by using the current map from logical space to physical space. Accessor 275 may mediate between non-volatile storage device driver 260 and the hardware device, non-volatile storage 205. Accessor 275 may receive a read or write request which refers to an address in logical memory. Accessor 275 may translate the logical address to a physical address using the current map 285. Accessor 275 may then issue a command to non-volatile storage 205 to perform the read or write operation.

Storer 280 may store the current mapping (map 285) between logical space and physical space. In many embodiments, the mapping (map 285) may be stored in CMOS (complementary metal-oxide-semiconductor). CMOS is a form of permanent storage which may be implemented as a chip powered by a small battery when power is off. The CMOS chip may contain BIOS and other system firmware. In further embodiments, the current map 285 may be stored in other locations, to provide for backup. For example, the current map may be stored in flash memory or other non-volatile storage. It may be designated with a special signature or heading so that it can be recognized.

The floating portion 240 of physical memory contains floating firmware 245, other non-volatile memory 250, and reserved space 255. Floating firmware 245 may include portions of firmware code that can be executed after the remapping layer 265 has been initialized. The remapping layer 265 may then locate these portions of firmware during start-up or reboot, thereby enabling their execution. Other NV memory 250 may include non-volatile memory that includes data other than firmware code. Reserved space 255 may comprise space used for error recovery or other system purposes, and not available for other purposes, such as for user applications. In some embodiments of fault-tolerant computers, reserved space 255 may consist of blocks of floating memory 240 that are not reported to an upper layer. For example, floating memory 240 may consist of 34 blocks, but only 32 may be reported to the upper layer. Therefore, if in some circumstance, a broken block is detected (after a long period of usage or a random access fault occurs in NAND flash), the system can utilize the blocks of reserved space 255 to remain coherent to the upper layer. In some embodiments, the use of reserved space 255 for recovery purposes may provide a computer the ability to recovery from error conditions and may consequently expand the lifetime of flash or other non-volatile memory.

The embodiment of FIG. 2 is for illustration and not limitation. In other embodiments, some of the components of FIG. 2 may be shifted between fixed memory and floating memory or may be omitted, and additional components may be placed in one or another or both of the memories.

Figure 3:
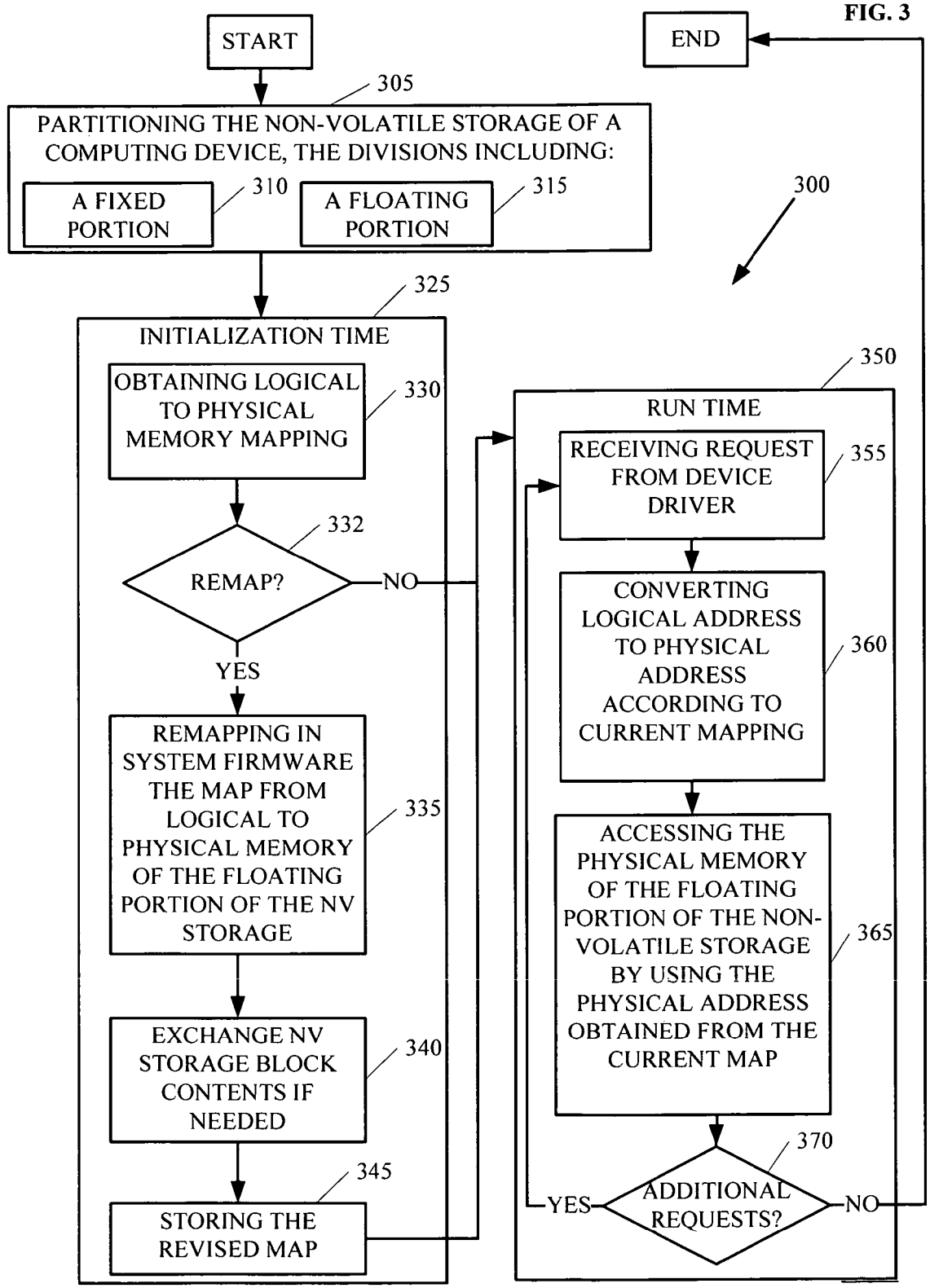
FIG. 3 is a flowchart of an embodiment of a method to remap non-volatile storage.

FIG. 3 depicts a flowchart 300 of an embodiment of a method to remap the map between logical space and physical space in non-volatile storage. The method may be carried out by a module such as remapping layer 265 depicted in FIG. 2. The method includes partitioning the non-volatile storage of the computing device (element 305). The partitions may include a fixed portion 310 and a floating portion 315. The fixed potion may contain critical portions of startup and rebooting, including code necessary to enable a remapping layer such as remapping layer 265 of FIG. 2.

The floating portion 315 may include the remainder of the non-volatile storage. The floating portion 315 may occupy a large portion of the non-volatile storage, including many non-critical firmware components to continue platform initialization, such as peripherals and user interfaces. System non-volatile storage may also be in this part. The floating portion 315 may be kept as large as possible, and the fixed portion 310 as small as possible, in order to take best advantage of the load balancing produced by regular remappings between the logical space of the non-volatile storage and the physical space of the non-volatile storage. The greater the size of the floating portion, the more blocks available for processes which heavily engage in write and erase cycles in the non-volatile storage, and the less usage of any particular block. In addition, in some embodiments, one or both partition of the physical space may contain reserved blocks. In further embodiments, these blocks may be used for error recovery.

The method of FIG. 3 includes elements performed at initialization time 325. These elements include execution of the remapping layer. The execution includes obtaining the logical to physical memory mapping 330. In order to translate between logical and physical space, the flash remapping layer needs to know the logical to physical flash block mapping in existence after the last boot. This mapping relationship may be saved in some other storage, such as CMOS RAM. This mapping relationship may also be saved in non-volatile storage area with some special signature, to facilitate the remapping layer's scanning for it if CMOS RAM content is lost.

During initialization time, remapping layer may use some pre-defined policy to determine if the mapping from the logical space to physical space mapping of floating part of non-volatile storage needs to be remapped or changed (element 332). In some embodiments, the policy may be based upon the time; e.g., a periodic remap. In other embodiments, the policy may be based upon usage statistics. After a certain number of writes or erasures or a combination of both, for example, a remap may be performed. If a remap is not indicated, the initialization time portion of FIG. 3 may be completed, and the run time portion (element 350) may be executed.

If a remap is indicated, the remapping may be performed (element 335). In addition, in some cases the remapping layer may exchange the contents of some blocks (element 340). For example, if the remapping changes the mapping of logical block 1 from physical block 4 to physical block 5, and physical block 4 contains current contents, then the contents of physical block 4 may be moved to physical block 5. The contents of physical block 5, in turn, may be moved to another block. The method of FIG. 3 includes storing the revised map (element 345)

During runtime (element 350), a request to access non-volatile storage may be received by a non-volatile storage device driver. The request may be to read the contents of a location, to write to a location, to erase the value stored in a location, or otherwise to access the non-volatile storage. The request may be bridged to the remapping layer (element 355). The remapping layer may then convert the logical address provided by the device driver into a physical address according to the current mapping (element 360). The remapping layer may then use the physical address to access the non-volatile storage hardware (element 365). If there are additional requests from device drivers (element 370), then steps 355 through 365 may be repeated. Otherwise, the method of flowchart 300 may end.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc., including wireless access mechanisms. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

It will be apparent to those skilled in the art having the benefit of this disclosure that the present invention contemplates methods and arrangements for remapping the map between logical space and physical space in non-volatile storage. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of addressing non-volatile storage of a computing device, the method comprising:
dividing a portion of non-volatile storage of the computing device into two portions, a fixed portion and a floating portion;
remapping in system firmware of the computing device the current map from logical space to physical space of the floating portion of non-volatile storage, thereby creating a revised map, wherein the portion of physical space mapped from the floating portion of logical space under the revised map is the same portion of physical space as the portion of physical space mapped from the floating portion of logical space under the current map;
storing the revised map; and
accessing the floating portion of the portion of non-volatile storage by using the revised map.

2. The method of claim 1, wherein the dividing comprises dividing the non-volatile storage into a fixed portion and a floating portion, wherein the fixed portion comprises a reset vector, processor initialization components, chipset initialization components, and memory initialization components.

3. The method of claim 1, wherein the remapping comprises remapping the current map from logical memory to physical memory periodically.

4. The method of claim 1, wherein the remapping comprises remapping the current map from logical memory to physical memory based upon executing in physical memory a certain number of writes or erasures or a combination of both writes and erasures subsequent to creation of the current map.

5. The method of claim 1, wherein:
the remapping comprises inducing a rotation of elements of the floating portion of physical space via mapping the image of an element of logical space under the current map to the image of the element of logical space under the revised map, the rotation comprising one of the following maps:
each element of the floating portion of physical space except the highest element is mapped to the next highest element of the floating portion of physical space; or each element of the floating portion of physical space except the lowest is mapped to the next lower element of the floating portion of physical space.

6. The method of claim 1, wherein the remapping comprises mapping elements of the floating portion of logical space to elements of the floating portion of physical space based upon usage, wherein an element of logical space with a higher usage is mapped to an element of physical space with a lower usage, and an element of logical space with a lower usage is mapped to an element of physical space with a higher usage.

7. The method of claim 6, wherein the remapping comprises:
ordering the elements of the floating portion of logical space by usage from lowest to highest;
ordering the elements of the floating portion of physical space by usage from highest to lowest; and
for each number i from 1 to the number of elements of the floating portion of logical space, mapping the ith element of the ordered list of elements of logical space to the ith element of the ordered list of elements of physical space.

8. The method of claim 1, wherein:
the elements of the fixed portion and the floating portion comprise blocks; and
the revised map maps the blocks of logical space onto the blocks of physical space.

9. The method of claim 1, wherein:
the fixed portion of non-volatile storage comprises a single block of non-volatile storage; and
the floating portion of non-volatile storage comprises firmware to be executed after initializing a portion of system firmware to translate logical space to physical space based upon the revised map from logical space to physical space, and non-volatile memory other than firmware code.

10. An apparatus for addressing non-volatile storage of a computing device, the apparatus comprising:
non-volatile storage, a portion of the non-volatile storage to be divided into two portions, a fixed portion and a floating portion;
a remapping layer, the remapping layer a component of system firmware of the computing device, the remapping layer to:
remap the current map from logical space to physical space of the floating portion of the non-volatile storage, thereby creating a revised map, wherein the portion of physical space mapped from the floating portion of logical space under the revised map is the same portion of physical space as the portion of physical space mapped from the floating portion of logical space under the current map;
store the revised map; and
access the floating portion of the non-volatile storage by using the revised map.

11. The apparatus of claim 10, wherein the non-volatile storage comprises flash memory.

12. The apparatus of claim 10, wherein the remapping layer comprises software intermediate between non-volatile memory and device drivers for the non-volatile memory.

13. The apparatus of claim 10, wherein the remapping layer comprises a component of BIOS.

14. The apparatus of claim 10, wherein:
the remapping layer is to store the revised map in CMOS; and
the remapping layer is to store the revised map in non-volatile storage other than CMOS,
the storing comprising designating the revised map in non-volatile storage with a special signature for ease of recognition.

15. A computer program product for addressing non-volatile storage of a computing device, the computer program product comprising:
a tangible computer readable storage medium;
first program instructions, to divide a portion of the non-volatile storage of the computing device into two portions, a fixed portion and a floating portion;
second program instructions to remap in system firmware of the computing device the current map from logical space to physical space of the floating portion of the non-volatile storage, thereby creating a revised map, wherein the portion of physical space mapped from the floating portion of logical space under the revised map is the same portion of physical space as the portion of physical space mapped from the floating portion of logical space under the current map;
third program instructions to store the revised map; and
fourth program instructions to access the floating portion of the non-volatile storage by using the revised map;
wherein the first, second, third, and fourth program instructions are stored on the tangible computer readable storage medium.

16. The computer program product of claim 15, wherein the first program instructions comprise program instructions to divide the non-volatile storage into a fixed portion and a floating portion, wherein the fixed portion comprises a single block of non-volatile storage comprising a reset vector, processor initialization components, chipset initialization components, and memory initialization components; and
the floating portion of non-volatile storage comprises firmware to be executed after initializing a portion of system firmware to translate logical space to physical space based upon the revised map from logical space to physical space, and non-volatile memory other than firmware code.

17. The computer program product of claim 15, wherein the second program instructions comprise program instructions to remap the current map from logical memory to physical memory periodically.

18. The computer program product of claim 15, wherein the second program instructions comprise program instructions to remap the current map from logical memory to physical memory based upon executing in physical memory a certain number of writes or erasures or a combination of both writes and erasures subsequent to creation of the current map.

19. The computer program product of claim 15, wherein the second program instructions comprise instructions to induce a rotation of elements of the floating portion of physical space via mapping the image of an element of logical space under the current map to the image of the element of logical space under the revised map, the rotation comprising one of the following maps:

each element of the floating portion of physical space except the highest element is mapped to the next highest element of the floating portion of physical space; or each element of the floating portion of physical space except the lowest is mapped to the next lower element of the floating portion of physical space.

20. The computer program product of claim 15, wherein the second program instructions comprise instructions to map elements of the floating portion of logical space to elements of the floating portion of physical space based upon usage, wherein an element of logical space with a higher usage is mapped to an element of physical space with a lower usage, and an element of logical space with a lower usage is mapped to an element of physical space with a higher usage; wherein the remapping comprises:

ordering the elements of the floating portion of logical space by usage from lowest to highest;

ordering the elements of the floating portion of physical space by usage from highest to lowest; and for each number i from 1 to the number of elements of the floating portion of logical space, mapping the ith element of the ordered list of elements of logical space to the ith element of the ordered list of elements of physical space.

* * * * *